United States Patent
Lin et al.

(10) Patent No.: US 7,592,378 B2
(45) Date of Patent: Sep. 22, 2009

(54) INK JET INK

(75) Inventors: Tyau-Jeen Lin, Chadds Ford, PA (US); Patrick F. McIntyre, West Chester, PA (US); Hamdy A. Elwakil, Hockessin, DE (US)

(73) Assignee: E.I. du Pont de Nemours and Company, Wilmington, DE (US)

( * ) Notice: Subject to any disclaimer, the term of this patent is extended or adjusted under 35 U.S.C. 154(b) by 0 days.

(21) Appl. No.: 12/011,618

(22) Filed: Jan. 28, 2008

(65) Prior Publication Data

US 2008/0138530 A1    Jun. 12, 2008

(51) Int. Cl.
*C09D 11/00* (2006.01)
(52) U.S. Cl. ............... 523/160; 523/161; 524/497; 524/500; 524/504; 524/505; 106/31.6
(58) Field of Classification Search .......... 523/160, 523/161; 524/497, 500, 504, 505; 106/31.6
See application file for complete search history.

(56) References Cited

U.S. PATENT DOCUMENTS

| 5,231,131 | A | * | 7/1993 | Chu et al. | 524/504 |
| 6,005,023 | A | * | 12/1999 | Anton et al. | 523/161 |
| 6,433,117 | B1 | * | 8/2002 | Ma et al. | 526/277 |
| 6,440,203 | B2 | * | 8/2002 | Kato | 106/31.6 |

* cited by examiner

*Primary Examiner*—Bernard Lipman
(74) *Attorney, Agent, or Firm*—Angela J. Grayson; Dennis Morrell

(57) ABSTRACT

The present invention pertains to an aqueous inkjet ink made from certain aqueous titanium dioxide slurries, and an associated inkjet ink set for inkjet printing. The invention also pertains to a method of inkjet printing with the ink and ink set. The use of the specific titanium dioxide slurries described herein result in inkjet inks having improved stability and better anti-settling performance with less pigment agglomeration and flocculation over time.

15 Claims, No Drawings

INK JET INK

BACKGROUND OF THE INVENTION

1. Field of the Invention

The present invention pertains to an aqueous inkjet ink made from certain titanium dioxide slurries and an associated inkjet ink set for inkjet printing. The invention also pertains to a method of inkjet printing with the ink and ink set. The use of the specific titanium dioxide slurries described herein result in inkjet inks having improved stability and better anti-settling performance with less pigment agglomeration and flocculation over time.

2. Description of the Related Art

Inkjet printing is a non-impact printing process in which droplets of ink are deposited on print media, such as paper or polymeric substrates, to form the desired image. The droplets are ejected from a printhead in response to electrical signals generated by a microprocessor.

Colored inkjet inks comprise one or more colorants that are dissolved (e.g., dyes) and/or dispersed (e.g., pigments and dispersed dyes) in the ink vehicle. The ink vehicle can be aqueous (a significant amount of water) or non-aqueous (predominantly organic liquid), and the ink is referred to as aqueous or non-aqueous ink accordingly.

Aqueous ink is advantageous because water is especially environmentally friendly. There are many applications, though, where aqueous ink is typically unsuitable and non-aqueous ink must be used. Many, if not most of these non-aqueous ink applications involve printed articles on hydrophobic substrates, and particularly printed articles on polymer substrates, which will be exposed to sunlight, and the preferred colorants in these applications are pigments because of their well-know advantage in fade resistance compared to dyes.

Dispersion of pigments in a non-aqueous vehicle is substantially different than dispersion in an aqueous vehicle. Generally, pigments that can be dispersed well in water do not disperse well in non-aqueous solvent, and vice versa.

Also, the demands of inkjet printing are quite rigorous and the standards of dispersion quality are high. Thus, pigments that may be "well dispersed" for other applications are often still inadequately dispersed for inkjet applications.

There is a need for improved pigment selection especially for a stable aqueous ink for inkjet inks. In particular, there is a need for white pigments that can be sufficiently stabilized in inkjet compatible formulations so that the resultant ink can be effectively jetted, even after being stored or otherwise unused for some period of time. In addition the ability to use an ink containing a white pigment to complement other inks of an ink set can lead to improved images, especially when lighter tones and/or higher degrees of coverage or opacity are needed.

White inks are useful and provide good visibility when printed on trans-parent and colored surfaces. White printing on these surfaces is desirable in numerous end uses, such as the computer industry (printed circuit boards, computer chips), recording industry (tapes, film, etc.), packaging and automotive coatings. White ink may be used not only to detail and add decals to automobiles, but also to other motor vehicles, including trucks, planes and trains, as well as bicycles, etc. White ink may also be useful on other surfaces, such as plastics, wood, metal, glass, textiles, polymeric films and leather for both practical and ornamental purposes.

White ink formulations typically contain a particulate white pigment dispersed in a solvent (aqueous or non-aqueous)/resin system. Current white ink formulations are not acceptable for numerous applications, such as commercial inkjet applications, primarily because of poor stability resulting in pigment settling and agglomeration. Poor stability may result in "nozzle outs" or plugging of the ink jet nozzles. For example, a typical print head on an industrial printer has 256 nozzles, each nozzle head having a diameter of about 50 microns in size. Large pigment particles and agglomerates may plug the nozzles. Poor stability also results in poor hiding, non-uniform coverage and poor clarity in the printed surface.

White ink formulations based on inorganic white pigments, such as titanium dioxide ($TiO_2$), may fail because of poor stabilization of the $TiO_2$ pigment. Pigment agglomeration and flocculation are often at fault in poor performance of white inks, particularly White inkjet inks, due to settling and nozzle plugging problems.

As a result, there is a need for an ink formulation containing a white pigment for use in ink and inkjet systems that avoid the aforementioned negative attributes. There is further a need for a titanium dioxide slurry that does not suffer from stability problems when incorporated into ink formulations. There is still a further need for an aqueous system that includes all these benefits. The present invention meets these needs.

SUMMARY OF THE INVENTION

In one aspect of the present invention, there is provided an aqueous inkjet ink comprising an aqueous vehicle having dispersed therein:

(a) a titanium dioxide pigment;
(b) a combination of dispersants comprising:
  (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
    (i) the polymeric backbone is hydrophobic in comparison to the macromonomer side chains and comprises one or more polymerized ethylenically unsaturated hydrophobic monomers and, optionally, up to about 20% by weight, based on the weight of the graft copolymer, of polymerized ethylenically unsaturated acid monomers; and
    (ii) each of the macromonomer side chains individually is a hydrophilic polymer containing acids groups attached to the polymeric backbone at a single terminal point, and
      (A) has a weight average molecular weight of from about 1000 to about 30000, and
      (B) comprises from about 2% to about 100% by weight, based on the weight of the macromonomer side chain, of a polymerized ethylenically unsaturated acid monomer, and
      (C) wherein the acid groups are at least partially neutralized, preferably with an inorganic base and/or an amine;
  (2) a block copolymer of type AB, ABA or ABC wherein at least one of the blocks in the block copolymer is an adsorbing segment, and wherein at least one of the blocks in the block copolymer is a stabilizing segment.

In another aspect of the present invention, there is provided an aqueous inkjet ink comprising a vehicle to which has been added an aqueous titanium dioxide slurry comprising:

(a) a titanium dioxide pigment; and
(b) a combination of dispersants comprising:
  (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
    (i) the polymeric backbone is hydrophobic in comparison to the macromonomer side chains and comprises polymerized ethylenically unsaturated hydrophobic monomers and, optionally, up to about 20% by weight, based on the weight of the graft copolymer, of polymerized ethylenically unsaturated acid monomers; and
    (ii) each of the macromonomer side chains individually is a hydrophilic polymer containing acids groups attached to the polymeric backbone at a single terminal point, and
      (A) has a weight average molecular weight of from about 1000 to about 30000, and
      (B) comprises from about 2% to about 100% by weight, based on the weight of the macromonomer side chain, of a polymerized ethylenically unsaturated acid monomer, and
      (C) wherein the acid groups are at least partially neutralized with an inorganic base or an amine;
  (2) a block copolymer of type AB, ABA or ABC wherein at least one of the blocks in the block copolymer is an adsorbing segment, and wherein at least one of the blocks in the block copolymer is a stabilizing segment; and
(c) a liquid carrier.

By an "aqueous inkjet ink" is meant an inkjet ink with a water content of greater than about 10 wt %, and preferably greater than about 25 wt %, based on the total ink weight.

These inkjet inks may further comprise a variety of optional additives of a general type known to those of ordinary skill in the art, as part of the titanium dioxide slurry and/or added to the inkjet ink separately therefrom. Such optional additives include, for example, other dispersants, humectants and rheology modifiers.

In one specific preferred embodiment, the inkjet ink further comprises, as a third dispersant, a phosphated acrylic copolymer, different from the graft copolymer (1) or block copolymer (2), comprising a hydrophilic stabilizing segment and a hydrophobic adsorbing segment. This third dispersant is preferably part of the titanium oxide slurry, but can also be added separately therefrom.

Advantageously, by use of the graft copolymer dispersant in combination with the block copolymer dispersant as listed above, an aqueous inkjet ink can be formulated in which settling of titanium dioxide particles is reduced. A further advantageous reduction in settling of particles is achieved using a blend of the graft copolymer dispersant, the block copolymer dispersant, and the phosphated acrylic copolymer as listed above. Moreover, even when settling does occur, the settling is "soft" settling, meaning the titanium dioxide pigment can be readily re-dispersed and rejuvenated by low shear mixing so as not to result in plugging of inkjet printhead nozzles. Low shear mixing includes, for example, simple shaking (e.g., by hand or movement of the inkjet printhead) or stirring with an impeller or mixing blades at speeds of less than about 500 rpm wherein no grinding occurs. In contrast, "hard" settling occurs with many titanium dioxide slurries of the prior art.

The titanium dioxide pigment used herein is white, thus the inkjet inks of the present invention are preferably white. Non-white colored inks can also be made by utilizing one or more additional colorants in the ink.

In accordance with another aspect of the present invention, there is provided an inkjet ink set comprising a plurality of colored, pigmented inks, at least one of which is an aqueous inkjet ink (and preferably a white inkjet ink) as set forth above.

The aqueous inkjet inks of the present invention are suitable, for example, for use in personal, business and industrial inkjet printers, and numerous other printing applications. Furthermore, they can be used for printing a wide variety of substrates including non-white paper, transparencies, polymer substrates, textiles, etc.

The present invention thus also provides a method for inkjet printing onto a substrate, comprising the steps of:
(1) providing an inkjet printer that is responsive to digital data signals;
(2) loading the printer with a substrate to be printed;
(3) loading the printer with the above-mentioned inkjet ink or inkjet ink set; and
(4) printing onto the substrate using the inkjet ink set in response to the digital data signals.

These and other features and advantages of the present invention will be more readily understood by those of ordinary skill in the art from a reading of the following detailed description. It is to be appreciated that certain features of the invention which are, for clarity, described above and below in the context of separate embodiments, may also be provided in combination in a single embodiment. Conversely, various features of the invention that are, for brevity, described in the context of a single embodiment, may also be provided separately or in any subcombination. In addition, references in the singular may also include the plural (for example, "a" and "an" may refer to one, or one or more) unless the context specifically states otherwise. Further, reference to values stated in ranges include each and every value within that range.

DETAILED DESCRIPTION OF THE PREFERRED EMBODIMENTS

The present invention provides an aqueous ink, preferably an aqueous white ink, that is preferably made from a particularly titanium dioxide slurry. The titanium dioxide slurry and ink made therefrom have improved stability to agglomeration upon storage. The titanium dioxide slurry and ink utilize specific mixtures of dispersants in amounts to stabilize and keep the pigments deflocculated over extended periods of time both in slurry form and when the slurry is subsequently used in an ink formulation. As a result, the ultimate ink formulation provides desirable properties such as good hiding, uniform coverage, and good clarity when applied to surfaces.

Titanium Dioxide Pigment

Titanium dioxide ($TiO_2$) pigment useful in the present invention may be in the rutile or anatase crystalline form. It is commonly made by either a chloride process or a sulfate process. In the chloride process, $TiCl_4$ is oxidized to $TiO_2$ particles. In the sulfate process, sulfuric acid and or containing titanium are dissolved, and the resulting solution goes through a series of steps to yield $TiO_2$. Both the sulfate and chloride processes are described in greater detail in "The Pigment Handbook", Vol. 1, 2nd Ed., John Wiley & Sons, NY (1988), the relevant disclosure of which is incorporated by reference herein for all purposes as if fully set forth.

The titanium dioxide particles can have a wide variety of average particle sizes of about 1 micron or less, depending on the desired end use application of the ink.

The titanium dioxide pigment is in and of itself white in color.

For applications demanding high hiding or decorative printing applications, the titanium dioxide particles preferably have an average size of less than about 1 micron (1000 nanometers). Preferably, the particles have an average size of from about 50 to about 950 nanometers, more preferably from about 75 to about 750 nanometers, and still more preferably from about 100 to about 500 nanometers. These titanium dioxide particles are commonly called pigmentary $TiO_2$.

For applications demanding white color with some degree of transparency, the pigment preference is "nano" titanium dioxide. "Nano" titanium dioxide particles typically have an average size ranging from about 10 to about 200 nanometers, preferably from about 20 to about 150 nanometers, and more preferably from about 35 to about 75 nanometers. An ink comprising nano titanium dioxide can provide improved chroma and transparency, while still retaining good resistance to light fade and appropriate hue angle. A commercially available example of an uncoated nano grade of titanium oxide is P-25, available from Degussa (Parsippany N.J.).

In addition, unique advantages may be realized with multiple particle sizes, such as opaqueness and UV protection. These multiple sizes can be achieved by adding both a pigmentary and a nano grade of $TiO_2$.

The titanium dioxide is preferably incorporated into an ink formulation via a slurry concentrate composition. The amount of titanium dioxide present in the slurry composition is preferably from about 15 wt % to about 80 wt %, based on the total slurry weight.

For slurries wherein the majority of titanium dioxide particles are of a pigmentary size, and preferably those in which the average particle size is greater than about 200 nanometers up to about 1 micron, the amount of titanium dioxide in the slurry is preferably from about 50 wt % to about 75 wt %, based on the total weight of the slurry.

For slurries wherein the majority of titanium dioxide particles are of "nano" size, and preferably those in which the average particle size is from about 10 nanometers to about 200 nanometers, the amount of titanium dioxide in the slurry is preferably from about 20 wt % to about 50 wt %, and more preferably from about 25 wt % to about 35 wt %, based on the weight of the slurry.

The titanium dioxide pigment may be substantially pure titanium dioxide or may contain other metal oxides, such as silica, alumina and zirconia. Other metal oxides may become incorporated into the pigment particles, for example, by co-oxidizing or co-precipitating titanium compounds with other metal compounds. If co-oxidized or co-precipitated metals are present, they are preferably present as the metal oxide in an amount from about 0.1 wt % to about 20 wt %, more preferably from about 0.5 wt % to about 5 wt %, and still more preferably from about 0.5 wt % to about 1.5 wt %, based on the total titanium dioxide pigment weight.

The titanium dioxide pigment may also bear one or more metal oxide surface coatings. These coatings may be applied using techniques known by those skilled in the art. Examples of metal oxide coatings include silica, alumina, alumina-silica and zirconia, among others. Such coatings may optionally be present in an amount of from about 0.1 wt % to about 10 wt %, and preferably from about 0.5 wt % to about 3 wt %, based on the total weight of the titanium dioxide pigment. Commercial examples of such coated titanium dioxides include R700 (alumina-coated, available from E.I. DuPont de Nemours, Wilmington Del.), RDI-S (alumina-coated, available from Kemira Industrial Chemicals, Helsinki, Finland), R-706 (available from DuPont, Wilmington Del.) and W-6042 (a silica alumina treated nano grade titanium dioxide from Tayco Corporation, Osaka Japan).

The titanium dioxide pigment may also bear one or more organic surface coatings, such as, for example, carboxylic acids, silanes, siloxanes and hydrocarbon waxes, and their reaction products with the titanium dioxide surface. The amount of organic surface coating, when present, generally ranges from about 0.01 wt % to about 6 wt %, preferably from about 0.1 wt % to about 3 wt %, more preferably about 0.5 wt % to about 1.5 wt %, and still more preferably about 1 wt %, based on the total weight of the pigment.

Dispersants

Specified combinations of dispersants provide enhanced effects in stabilizing titanium dioxide pigment slurries and, furthermore, provide enhanced stability in the ink formulations. The inks of the present invention, and the titanium dioxide slurry utilized in making those inks, comprise a first dispersant, which is a graft copolymer, a second dispersant, which is a block copolymer and, optionally, a third dispersant which is a phosphated polymer. Both the first and second dispersants preferably contain acid functionality, and can be made water soluble or dispersible by neutralizing at least a portion of the acid functional groups with a base such as ammonia, potassium hydroxide, sodium hydroxide, an amine, such as dimethyl ethyl amine, amino methyl propanol and the like.

The optional third dispersant is a phosphated polymer that is different from the first and second dispersants.

Structured (graft and block) acrylic copolymer dispersant blends neutralized using dimethyl ethyl amine are preferred.

The inks of the present invention, and titanium dioxide slurry used in those inks, preferably have an overall dispersant to pigment weight ratio (D/P) of from about 0.0025:1 to about 0.25:1, preferably from about 0.05:1 to about 0.175:1, and more preferably from about 0.075:1 to about 0.14:1. The overall dispersant to pigment ratio is the sum total of D/P contributions from each dispersant present.

The weight ratio of the first and second dispersants is preferably from about 10:90 to about 90:10, more preferably from about 25:75 to about 75:25, and still more preferably from about 40:60 to about 60:40.

When the optional third dispersant is present, it is preferably present in an amount of from about 0.0025:1 to about 0.05:1, more preferably from about 0.005:1 to about 0.04:1, and still more preferably from about 0.005:1 to 0.02:1, as the weight ratio of third dispersant to pigment.

First Dispersant

Note: All molecular weights referred to herein are determined by Gel Permeation Chromatography using polystyrene as a standard.

The first dispersant is a graft copolymer dispersant preferably having a weight average molecular weight of from about 4000 to about 100000, and more preferably from about 10000 to about 40000. The graft copolymer dispersant can be a block or comb copolymer. Mixtures of more than one graft copolymer can also be used.

The graft copolymer comprises from about 90% to about 50% by weight of a polymeric backbone and, correspondingly, from about 10% to about 50% by weight of polymeric side chains attached to the backbone (the backbone and side chains together being 100 wt %).

The polymeric backbone is a hydrophobic (relative to the side chains) adsorbing segment. The side chains are individually hydrophilic stabilizing segments. The side chains are attached to the backbone at a single terminal point.

Backbone

As just indicated, the backbone of the graft copolymer dispersant is hydrophobic relative to the side chains. The backbone comprises polymerized "non-functional" ethylenically unsaturated hydrophobic monomers such as alkyl methacrylates and acrylates, and cycloaliphatic methacrylates and acrylates, such as those listed hereinafter. The backbone may still further comprise up to about 20% by weight, and preferably from about 1% to about 10% by weight, based on the weight of the backbone, of polymerized ethylenically unsaturated acid monomers, such as those listed hereinafter, as well as up to about 30% by weight, based on the weight of the backbone, of other polymerized ethylenically unsaturated monomers containing functional groups, such as those listed hereinafter.

The backbone of the graft copolymer has an affinity for the surface of the pigment used in the slurry and anchors the copolymer to the pigment, thus keeping the pigment dispersed and preventing the graft copolymer from returning to the aqueous phase.

Suitable "non-functional" hydrophobic monomers that can be used to form the hydrophobic adsorbing segment include, but are not limited to, alkyl (meth)acrylates having 1 to 12 (and preferably 1 to 8) carbon atoms in the alkyl group, and cycloaliphatic (meth)acrylates. Of these, the methacrylates are preferred.

Typical alkyl acrylates and methacrylates that can be used include, for example, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, pentyl acrylate, pentyl methacrylate, hexyl acrylate, hexyl methacrylate, 2-ethyl hexyl acrylate, 2-ethyl hexyl methacrylate, nonyl acrylate, nonyl methacrylate, lauryl acrylate, lauryl methacrylate and the like.

Typical cycloaliphatic acrylates and methacrylates that can be used include, for example, trimethylcyclohexyl acrylate, trimethylcyclohexyl methacrylate, t-butyl cyclohexyl acrylate, isobutylcyclohexyl methacrylate and the like.

Mixtures of "non-functional" ethylenically unsaturated hydrophobic monomers may be used, for example, mixtures of two or more of any of the above listed acrylates and methacrylates.

Examples of ethylenically unsaturated acid monomers include methacrylic acid, acrylic acid, itaconic acid, maleic acid and the like; and ethylenically unsaturated sulfonic and sulfinic acid and esters thereof, such as styrene sulfonic acid, acrylamido propane sulfonic acid, acrylamido methyl propane sulfonic acid and the like. When used, acrylic and methacrylic acid are preferred.

Examples of functional monomers (other than the ethylenically unsaturated acid monomers) include acrylamide, methacrylamide, methacrylonitrile, hydroxy ethyl acrylate, hydroxy ethyl methacrylate, t-butylamino ethyl methacrylate, diethyl amino ethyl acrylate, diethyl amino ethyl methacrylate, nitro phenol acrylate, nitro phenol methacrylate, phthalimido methyl acrylate and phthalimido methacrylate.

Side Chains

The side chains of the graft copolymer are hydrophilic macromonomers that preferably have a weight average molecular weight of from about 1000 to about 30000, and more preferably from about 1500 to about 8000. The side chains preferably comprise from about 2% to about 100% by weight, more preferably from about 20% to about 60% by weight, based on the weight of the macromonomer, of polymerized ethylenically unsaturated "hydrophilic" monomers, such as ethylenically unsaturated monomers containing an acid group or a non-ionic hydrophilic group.

When an appropriate amount of the acid functionality is neutralized, the side chains are hydrophilic and keep the pigment uniformly dispersed in the slurry and in resulting ink.

The side chains can be a mixture of ionic and non-ionic groups or mixtures either in the same side chain or in different side chains.

The macromonomer contains a single terminal ethylenically unsaturated group, which is polymerized into the backbone of the graft copolymer.

It is preferred to use ethylenically unsaturated acid monomers, and more preferably methacrylic acid, particularly if it is the sole constituent of the macromonomer. Other acid monomers that can be used include ethylenically unsaturated carboxylic acids such as acrylic acid, itaconic acid, maleic acid and the like; and ethylenically unsaturated sulfonic and sulfinic acid and esters thereof, such as styrene sulfonic acid, acrylamido propane sulfonic acid, acrylamido methyl propane sulfonic acid and the like.

Non-ionic hydrophilic monomers that are useful in the hydrophilic stabilizing segment include monoethylenically unsaturated poly(alkylene glycol) monomers, such as poly (ethylene glycol) mono (meth)acrylate, poly(ethylene glycol) alkyl ethers having 1 to 4 carbon atoms in the alkyl group (such as poly(ethylene glycol) methyl ether oligomers, supplied under the trade name Bisomer S20W by International Specialty Chemicals), and the like; and poly(alkoxylated) alkyl (meth)acrylates and the like. These monomers preferably have a weight average molecular weight of from about 200 to about 4000, and more preferably from about 200 to about 2000.

Up to about 80% by weight, based on the weight of the macromonomer, of other hydrophobic polymerized ethylenically unsaturated monomers can be present in the macromonomer, including the "non-functional" alkyl acrylates and methacrylates, cycloaliphatic acrylates and methacrylates listed above.

One preferred macromonomer contains from about 50% to about 80% by weight of polymerized methyl methacrylate, and from about 20% to about 50% by weight of polymerized methacrylic acid (100 wt % total), and has a weight average molecular weight of from about 2000 to about 5000. The monomers constituting the macromonomer are preferably polymerized using a catalytic chain transfer agent that contains a $Co^{+2}$ group, i.e. a cobalt chain transfer agent, which ensures that the resulting macromonomer only has one terminal ethylenically unsaturated group which will polymerize with the backbone monomers to form the graft copolymer. Typically, in the first step of the process for preparing the macromonomer, the monomers are blended with an inert organic solvent, which is preferably water miscible or water dispersible, and a cobalt chain transfer agent and heated usually to the reflux temperature of the reaction mixture. In subsequent steps additional monomers, cobalt chain transfer agent and a conventional azo type polymerization catalyst (such as 2,2'-azobis(2-methylbutanenitrile), 2,2'-azobis(2,4'-dimethylpentanenitrile) and 2,2'-azobis(2,4-dimethyl-4-methoxyvaleronitrile)) are added and polymerization is continued until a macromonomer is formed of the desired molecular weight. After macromonomer is formed, any solvent may be stripped off before additional processing to make the first dispersant graft copolymer.

Preferred cobalt chain transfer agents are described in U.S. Pat. Nos. 4,680,352 and 4,722,984 (the disclosures of which are incorporated by reference herein for all purposes as if fully set forth). Most preferred are pentacyanocobaltate (II), diaquabis(borondifluorodimethyl-glyoximato) cobaltate(II) and diaquabis(borondifluorophenylglyoximato) cobaltate (II). Typically these chain transfer agents are used at concentrations of from about 5 ppm to about 1000 ppm, based on the weight of the monomers used.

Preparation of First Dispersant

The graft copolymer used in the present invention is preferably prepared by the Special Chain Transfer (SCT) method as described in U.S. Pat. No. 5,231,131 (the disclosure of which is incorporated by reference herein as if fully set forth). By using this method, 100% graft copolymer can be efficiently prepared rather than a mixture of graft copolymer, low molecular weight backbone polymer and copolymerized macromonomer segments, as is generally been the case with other processes used for making graft copolymers. However, it should be recognized that the graft copolymer dispersant used in this invention is not restricted to any specific preparation technology. Graft dispersants of the structure and functionality described above made using other known polymerization techniques will also provide benefits of this invention and are thus contemplated to be within the scope of this invention.

To form the graft copolymer, backbone monomers are polymerized in the presence of solvent, polymerization catalyst and macromonomer prepared, for example, as described above. Any of the aforementioned azo type catalysts can be used as the polymerization catalyst, as can other suitable catalysts such as peroxides and hydroperoxides. Typical of such catalysts are di-tertiarybutyl peroxide, di-cumyl peroxide, tertiaryamyl peroxide, cumenehydroperoxide, di(n-propyl) peroxydicarbonate, peresters such as amyl peroxyacetate and the like. Polymerization is continued usually at the reflux temperature of the reaction mixture until a graft copolymer is formed of the desired molecular weight.

Typical solvents that can be used to form the macromonomer and/or the graft copolymer are ketones such as methyl ethyl ketone, isobutyl ketone, ethyl amyl ketone and acetone; alcohols such as methanol, ethanol and isopropanol; esters such as ethyl acetate; glycols such as ethylene glycol and propylene glycol; ethers such as tetrahydrofuran and ethylene glycol mono butyl ether; and the like.

After the graft copolymer is formed, the acid functionality thereon can be at least partially neutralized with, for example, an amine or an inorganic base such as ammonium hydroxide or sodium hydroxide, and then water is added to form a dispersion of the graft copolymer. Typical amines that can be used include amino methyl propanol, amino ethyl propanol, dimethyl ethyl amine, triethylamine and the like. A preferred amine for inkjet applications is dimethyl ethyl amine.

Typically, these first dispersant graft copolymers and the other dispersants described below are used as from about 20% to about 60% solutions in typical solvents.

Particularly useful graft copolymers include the following:

a graft copolymer having a backbone of polymerized methyl acrylate and butyl acrylate, and side chains of a macromonomer having a weight average molecular weight of from about 2000 to about 5000, and containing from about 50% to about 80% by weight, based on the weight of the macromonomer, of polymerized methyl methacrylate and from about 20% to about 50% by weight, based on the weight of the macromonomer, of polymerized methacrylic acid;

a graft copolymer having a backbone of polymerized methyl acrylate, butyl acrylate and acrylamido methyl propane sulfonic acid, and side chains of the above macromonomer;

a graft copolymer having a backbone of polymerized methyl acrylate, butyl acrylate and acrylic acid, and side chains of the above macromonomer;

a graft copolymer having a backbone of polymerized ethyl acrylate, and side chains of the above macromonomer;

a graft copolymer having a backbone of polymerized ethyl acrylate, methyl acrylate and acrylic acid, and side chains of the above macromonomer; and a graft copolymer having a backbone of polymerized ethyl acrylate and acrylic acid, and side chains of the above macromonomer.

Second Dispersant

The second dispersant is a block copolymer preferably of type AB, ABA or ABC, or mixtures thereof. At least one of the blocks, A, B, or C is an adsorbing segment. At least one of the blocks, A, B, or C is a stabilizing segment. By "adsorbing segment" it is meant that the segment is designed to adsorb onto the surface of a titanium dioxide pigment, for example, by acid-base or other bonding interactions. By "stabilizing segment" it is meant that the segment is designed to provide a steric stabilization of the pigment particle against flocculation in a slurry composition. Generally, the adsorbing segments of the block copolymer are hydrophobic, in comparison to the stabilizing segment, and are designed to adhere to the pigment surface, while the stabilizing segments are generally hydrophilic and are soluble in (aqueous) processing media, for example, media used in finishing crude titanium dioxide pigment.

The hydrophobic adsorbing segment preferably comprises polymerized "non-functional" ethylenically unsaturated hydrophobic monomers such as are listed hereinafter, and further comprises polymerized ethylenically unsaturated monomers having functional groups that enhance the pigment binding force. Monomers having functional groups are preferably present in an amount up to about 40% by weight, based on the total weight of the adsorbing segment. For example, monomers with acid functional groups may be incorporated in the hydrophobic portion to bind with basic groups on the titanium dioxide pigment surface. Monomers with amine groups may be incorporated in the hydrophobic portion to bind with acid groups that may be present on the titanium dioxide surface. Other functional monomers that have known affinity for titanium dioxide, such as monomers with silane groups, etc., may also be incorporated in the hydrophobic portion.

Suitable "non-functional" hydrophobic monomers that can be used to form the hydrophobic adsorbing segment include, but are not limited to, alkyl (meth)acrylates having 1 to 12 (and preferably 1 to 8) carbon atoms in the alkyl group, and cycloaliphatic (meth)acrylates. Of these, the methacrylates are preferred.

Typical alkyl acrylates and methacrylates that can be used include, for example, methyl acrylate, methyl methacrylate, ethyl acrylate, ethyl methacrylate, propyl acrylate, propyl methacrylate, isopropyl acrylate, isopropyl methacrylate, butyl acrylate, butyl methacrylate, pentyl acrylate, pentyl methacrylate, hexyl acrylate, hexyl methacrylate, 2-ethyl hexyl acrylate, 2-ethyl hexyl methacrylate, nonyl acrylate, nonyl methacrylate, lauryl acrylate, lauryl methacrylate and the like.

Typical cycloaliphatic acrylates and methacrylates that can be used include, for example, trimethylcyclohexyl acrylate, trimethylcyclohexyl methacrylate, t-butyl cyclohexyl acrylate, isobutylcyclohexyl methacrylate and the like.

Mixtures of "non-functional" ethylenically unsaturated hydrophobic monomers may be used, for example, mixtures of two or more of any of the above listed acrylates and methacrylates.

Examples of ethylenically unsaturated acid monomers include methacrylic acid, acrylic acid, itaconic acid, maleic acid and the like; and ethylenically unsaturated sulfonic and sulfinic acid and esters thereof, such as styrene sulfonic acid, acrylamido propane sulfonic acid, acrylamido methyl propane sulfonic acid and the like. Methacrylic acid is preferred, particularly if it is the sole acid constituent.

Examples of ethylenically unsaturated monomers with amine groups include alkylaminoalkyl methacrylate monomers having 1 to 4 carbon atoms in the alkyl group, such as dimethylaminoethyl methacrylate, diethylaminoethyl methacrylate, dipropylaminoethyl methacrylate, dibutylaminoethyl methacrylate) and the like.

As stated above, the stabilizing segment is preferably soluble in the selected (aqueous) processing medium encountered during crude pigment finishing and, therefore, primarily comprises polymerized ethylenically unsaturated hydrophilic monomers. Suitable hydrophilic monomers that can be used to form the stabilizing segment include ethylenically unsaturated monomers with an acid group, as well as ethylenically unsaturated monomers with a nonionic hydrophilic group, as listed above.

If acid monomers are used, the stabilizing segment is render hydrophilic by neutralizing an appropriate amount of the acid functionality with, for example, an amine (such as dimethyl ethyl amine or 2-amino methyl propanol) and/or an inorganic base (such as ammonium hydroxide or sodium hydroxide).

In addition to the forgoing monomers, other commonly used hydrophobic monomers can be copolymerized into the stabilizing portion, provided they are used at a concentration that will not significantly change the solubility properties of the stabilizing portion in the selected processing medium. Some useful examples include the alkyl (meth)acrylates and other hydrophobic monomers listed above.

The second dispersant preferably has a number average molecular weight of from about 1000 to about 15000, and more preferably from about 2000 to about 5000. The adsorbing segment preferably has a number average molecular weight of from about 1000 to about 5000, and more preferably from about 1000 to about 3000. The stabilizing segment preferably has a number average molecular weight of from about 1000 to about 5000, and more preferably from about 1000 to about 3000.

The method of preparation of the second dispersant is not critical. Block copolymer dispersants of the structure and functionality described above made using known polymerization techniques will provide the benefits of this invention and are thus contemplated to be within the scope of this invention. The second dispersant may be prepared, for example, by using the Group Transfer Polymerization (GTP) method reported in U.S. Pat. No. 4,656,226; or the anionic polymerization method reported by Morton in Anionic Polymerization: Principles and Practice (New York: Academic Press, 1983) (the disclosures of which are incorporated by reference herein for all purposes as if fully set forth).

The GTP method is preferred. An advantage of the GTP process is the ability to make polymer dispersants with precise architecture and low polydispersity. Typically polydispersity of GTP polymers is between about 1.0 and about 1.25.

Third Dispersant

The optional third dispersant is a phosphated polymer dispersant comprising a hydrophilic stabilizing segment and a hydrophobic adsorbing segment. The phosphated polymer can be a graft copolymer, a block copolymer or a random copolymer that has phosphate functionality in either the stabilizing segment, adsorbing segment or both.

The adsorbing segment of the phosphated polymer mainly comprises polymerized ethylenically unsaturated "non-functional" hydrophobic monomers, such as alkyl (meth)acrylates, cycloaliphatic (meth)acrylates and aryl (meth)acrylates, such as are listed hereinafter. The term (meth)acrylate refers to both the acrylate and methacrylate esters.

The adsorbing segment preferably further comprises from about 1% to about 20% by weight, and more preferably from about 1% to about 10% by weight, based on the total weight of the copolymer, of polymerized ethylenically unsaturated monomers that have attached thereto a phosphate group, or a group that can be converted to a phosphate group, as discussed in further detail below.

Suitable "non-functional" hydrophobic monomers that can be used to form the hydrophobic adsorbing segment include, but are not limited to, the alkyl (meth)acrylates having 1 to 12 (and preferably 1 to 8) carbon atoms in the alkyl group, cycloaliphatic (meth)acrylates, and mixtures thereof, as described above.

The hydrophilic stabilizing segment of the phosphated dispersant comprises polymerized ethylenically unsaturated hydrophilic monomers, such as ethylenically unsaturated monomers containing an acid group or a nonionic hydrophilic group.

Examples of ethylenically unsaturated acid monomers include methacrylic acid, acrylic acid, itaconic acid, maleic acid and the like; ethylenically unsaturated sulfonic and sulfinic acid and esters thereof, such as styrene sulfonic acid, acrylamido propane sulfonic acid, acrylamido methyl propane sulfonic acid and the like; and ethylenically unsaturated phosphoric or phosphonic acid and esters, vinyl phosphonic acid and its esters, and the like.

Non-ionic hydrophilic monomers that are useful in the hydrophilic stabilizing segment include monoethylenically unsaturated poly(alkylene glycol) monomers, such as poly (ethylene glycol) mono (meth)acrylate, poly(ethylene glycol) alkyl ethers having 1 to 4 carbon atoms in the alkyl group (such as poly(ethylene glycol) methyl ether oligomers, supplied under the trade name Bisomer S20W by International Specialty Chemicals), and the like; and poly(alkoxylated) alkyl (meth)acrylates and the like. These monomers preferably have a weight average molecular weight of from about 200 to about 4000, and more preferably from about 200 to about 2000. A combination of nonionic and anionic stabilizing segments can also be favorable.

Phosphate groups can be incorporated into the adsorbing segment or the stabilizing segment by reacting the polymer with phosphoric acid or phosphorus pentoxide. Unreacted or residual phosphoric acid groups are preferably neutralized with amine or inorganic base when used for dispersing titanium dioxide pigment into water. The remainder of the polymer may be adjusted to improve dispersibility of the titanium dioxide pigment and make the copolymer more compatible with other components to form a stabilized pigment slurry.

Alternatively, phosphate groups may be incorporated into the polymer by reaction of a phosphorus containing reactive group with a monomer, macromonomer or polymer such that the resultant optional dispersant is a phosphate-substituted dispersant. An example of this strategy is forming a polymer having reactive hydroxyl groups, for example, by forming a copolymer with hydroxy alkyl methacrylates or acrylates, and subsequently reacting the hydroxy groups with phosphorus pentoxide. Neutralizing phosphoric acid groups with amine or inorganic base is preferable for aqueous titanium dioxide slurries.

Suitable monomers with phosphate groups that can also be used to introduce phosphate groups into the copolymer (adsorbing segment or stabilizing segment) include ethylenically unsaturated phosphate monomers (such as phosphorylated polyethylene glycol (meth)acrylate, phosphorylated hydroxy ethyl (meth)acrylate, and the like) or ethylenically unsaturated monomers containing alcohol groups (such as hydroxy alkyl (meth)acrylate) or epoxy groups (such as glycidyl acrylate and glycidyl (meth)acrylate) which are treated with one or more phosphorylating agents (such as phosphoric acid or phosphorous pentoxide) before or after polymerization to form phosphate groups where the epoxy or alcohol groups used to be.

The phosphated copolymer dispersant preferably has a number average molecular weight of from about 4000 to about 25000, and more preferably from about 5000 to about 20000. The adsorbing segment typically has a number average molecular weight of from about 2000 to about 10000, and preferably from about 4000 to about 7000. The stabilizing segment typically has a number average molecular weight of from about 2000 to about 15000, and preferably from about 4000 to about 7000. The adsorbing segment typically comprises from about 20% to about 80% by weight of the polymer, and correspondingly the stabilizing segment typically comprises from about 80% to about 20% by weight of the polymer (the adsorbing and stabilizing segments being 100 wt % total).

The forgoing dispersants may be prepared by a variety of well known solution polymerization techniques devised for a particular structure, such as by the GTP (Group Transfer Polymerization) method reported in previously incorporated U.S. Pat. No. 4,656,226; by the standard anionic or the free radical polymerization method reported in previously incorporated U.S. Pat. No. 4,656,226; or by the SCT method reported in previously incorporated U.S. Pat. No. 5,231,131.

The GTP method is traditionally used to form block copolymers. Using this method, it is generally recommended to block any acid or hydroxyl containing monomers to prevent side reactions during polymerization. Following polymerization, the acid and hydroxyl groups are unblocked by a reaction with alcohol or water.

The SCT method is traditionally used to form the macromonomer portion of a graft copolymer. Macromonomers can also be supplied by other means.

Standard anionic polymerization is oftentimes used to form random copolymers and may be used to prepare analogues of resins described herein.

Titanium Dioxide Slurry

The slurry formed from the titanium dioxide, graft copolymer dispersant, a block copolymer dispersant and optional phosphated polymer, is a stable slurry. When settling does occur, the settling is "soft" settling, meaning the titanium dioxide pigment can be readily re-dispersed and rejuvenated by low shear mixing. The pigment is also similarly stably dispersed when the slurry is formulated into inks, so as not to result in plugging of ink jet nozzles. Low shear mixing includes, for example, shaking by hand or stirring with an impeller or mixing blades at speeds of less than about 500 rpm wherein no grinding occurs. In contrast, "hard" settling occurs with many titanium dioxide slurries of the prior art. By hard settling it is meant the settling of titanium dioxide particles from the slurry cannot be re-dispersed to an acceptable level for ink jet inks.

Liquid Carrier for Preparation of the Titanium Dioxide Slurries

The titanium dioxide slurry used in this invention comprises a liquid carrier. The carrier is selected from the group consisting of water, glycol ethers and mixtures thereof. The liquid carrier should be capable of providing a stable slurry. Typically the liquid carrier is water, or a mixture of water and a water-miscible co-solvent. Preferably the liquid carrier is an "aqueous" carrier which, in the context of the present invention, comprises a predominant amount of water (>50% by weight based on the total weight of the liquid carrier).

Water used in the preparation of the titanium dioxide slurries is preferably deionized. That is, the water has been treated to remove unwanted ions that may affect the stability and other properties of the slurries. For example, water may be passed through an ion exchange column to remove the unwanted ions. Preferably, the metal ion content of the deionized water provides an electrical resistance less than about 0.05 micro-ohm-cm electrical resistivity as measured using ASTM method D 1125.

Glycol ethers useful in providing titanium dioxide slurries include dipropylene glycol monomethyl ether and propylene glycol normal propyl ether, for example, those sold by Lyondell Chemical Company under the trade names Arcosolv® DPM and Arcosolv® PNP, respectively.

Preferably, the liquid carrier for the titanium dioxide slurry is aqueous, and more preferably it comprises water in a predominant amount.

Optional Additives for the Titanium Dioxide Slurry

The titanium dioxide slurry used in the present invention may optionally comprise one or more optional additives that are compatible with the end use in inkjet inks.

For example, the titanium dioxide slurry may optionally comprise a humectant. A humectant may be considered a co-solvent. Typically, although not always, a humectant has a higher boiling point than the primary solvent, that is, the liquid carrier. A humectant is generally added to prevent drying during storage. Humectants may also help retard settling.

Humectants are especially useful additives to formulations that have a propensity for chalking. Chalking occurs when solvent (that is, liquid carrier for the slurries of this invention) evaporates, pigment, especially the titanium dioxide pigment, dries on surfaces, and sides of storage vessels and may flake off and fall back into the slurry. Chalking can be a serious problem. For example, if dried pigment agglomerates are introduced into an ink jet formulation, an unacceptable level of nozzle outs may occur. Humectants retard solvent evaporation and thereby retard chalking.

Examples of suitable humectants for use in this invention include polyhydric alcohols such as ethylene glycol, diethylene glycol, propylene glycol, butylene glycol, triethylene glycol, 1,5-pentanediol and 1,2,6-hexanetriol; glycol ethers such as dipropylene glycol monomethyl ether and propylene glycol normal propyl ether; and others including trimethylolpropane, trimethylolethane, glycerin, polyethylene glycol and dipropylene glycol. Ethylene glycol is preferred.

The titanium dioxide slurry may also optionally comprise a rheology modifier. A rheology modifier can be any known commercially available rheology modifiers, such as Solthix® thickeners available from Avecia. Other useful rheology modifiers include cellulose and synthetic hectorite clays. Synthetic hectorite has the formula:

wherein w=3 to 6; x=0 to 3; y=0 to 4; z=12−2w−x, wherein the negative lattice charge is balanced by counterions, and wherein the counterions are selected from the group consisting of $Na^+$, $K^+$, $NH_4^+$, $Li^+$, $Mg^{2+}$, $Ca^{2+}$, $Ba^{2+}$, $N(CH_3)_4^+$, and mixtures thereof. Synthetic hectorite clays are commercially available, for example, from Southern Clay Products, Inc., and include Laponite®; Lucenite SWN®, Laponite S®, Laponite XL®, Laponite RD® and Laponite RDS® brands of synthetic hectorite.

Preparation of Titanium Dioxide Slurry

The titanium dioxide slurry used in this invention can be prepared by mixing the components in a mixing vessel. Components can be added sequentially or simultaneously in any order. The following provides a typical process to pre-pare the slurry, but should not be considered limiting. Typically, a two-step process is used involving a first mixing step followed by a second grinding step. The first step comprises mixing all of the ingredients, that is, titanium dioxide pigment, dispersants, liquid carrier and any optional additives to provide a blended "premix". Mixing generally occurs in a stirred vessel. High-speed dispersers are particularly suitable for the mixing step. Preferably, the dispersants are combined before introducing into the mixture of other ingredients. The combined dispersants are typically added incrementally.

The second step comprises grinding of the pre-mix to produce a titanium dioxide slurry. Preferably grinding occurs by media milling although other techniques can be used. Following a grinding step, the slurry is filtered. Filtration can be performed using any means known in the art, and is typically accomplished by use of standard, commercially available filters between 1 and 10 microns in size.

Preparation of Inks

The inks of this invention are preferably made from the titanium dioxide slurries described above, by conventional process known to the art. That is, the titanium oxide slurry is processed by routine operations to become an ink which can be successfully jetted in an inkjet system.

Typically, in preparing an ink, all ingredients except the pigment slurry are first mixed together. After the other ingredients are mixed, the slurry is added. Common ingredients in ink formulations useful with the titanium dioxide slurries include one or more humectants, a co-solvent, one or more surfactants and biocide. A typical ink using the titanium dioxide slurry will have the following formulation:

| Ingredient | Weight % |
| --- | --- |
| $TiO_2$ Slurry* | 0.7-50% |
| Humectant(s) | 5-20% |
| Co-Solvent | 5-30% |
| Surfactant(s) | 0.5-1.0% |
| Biocide | 0.15% |
| Water | 0 to 70% |
| Total | 100% |

*Solids content ~70%; includes $TiO_2$ and dispersants

The titanium dioxide slurry used in this invention utilizes a specific mixture of dispersants in specific amounts to stabilize and keep the pigments deflocculated over long periods of time both in slurry form and when the slurry is subsequently used in an ink formulation. As a result, the ink formulation is stable and non-flocculated or agglomerated and has other advantageous properties when applied to surfaces as an ink. The neutralization of the dispersants can depend on the final vehicle use in the ink, the printed substrate etc.

Alternatively, the ink may be prepared without the intervening step of pre-paring a pigment slurry. That is, the $TiO_2$ pigment and other ingredients of the ink can be combined in any order and this mixture is subject to dispersing mixing. The intensity of the mixing can range from milling using a ball mill with or more intense dispersive mixing such as HSD, roll milling or media milling can be used to obtain the final ink formulation. There are no constraints on the milling media.

Ink Vehicle

The ink vehicle is an aqueous vehicle comprising water and, optionally, one or more water-miscible cosolvents. Representative examples of water-miscible co-solvents are disclosed in U.S. Pat. No. 5,085,698 (the disclosure of which is incorporated by reference herein for all purposes as if fully set forth). The proportion of ingredients in the aqueous vehicle should be such as to result in an aqueous inkjet ink having a water content of greater than about 10 wt %, and preferably greater than about 25 wt %, based on the total ink weight.

If a mixture of water and a water-soluble solvent is used, the aqueous vehicle typically will contain from about 25% to about 95% water with the balance (i.e., about 75% to about 5%) being the water-soluble solvent.

The amount of aqueous vehicle in the ink (non-solids) is typically in the range of about 70% to about 99.8%, and preferably about 80% to about 99.8%, based on total weight of the ink.

Other Ingredients

The inks may optionally contain one or more other ingredients such as, for example, surfactants, binders, bactericides, fungicides, algicides, sequestering agents, buffering agents, corrosion inhibitors, light stabilizers, anti-curl agents, thickeners, and/or other additives and adjuvants well-known in the relevant art.

Additional dispersants can be added to the ink system to obtain stable ink dispersions. Examples of other dispersants that can be advantageously used are Disperbyk® 2000 and 2001 from Byk Chemie.

These other ingredients may be formulated into the inks and used in accordance with this invention, to the extent that such other ingredients do not interfere with the stability and jettability of the ink, which may be readily determined by routine experimentation. The inks may be adapted by these additives to the requirements of a particular inkjet printer to provide an appropriate balance of properties such as, for instance, viscosity and surface tension, and/or may be used to improve various properties or functions of the inks as needed.

The amount of each ingredient must be properly determined, but is typically in the range of from about 0 to about 15% by weight and more typically from about 0.1% to about 10% by weight, based on the total weight of the ink.

Surfactants may be used and useful examples include ethoxylated acetylene diols (e.g. Surfynols® series from Air Products), ethoxylated primary (e.g. Neodol® series from Shell) and secondary (e.g. Tergitol® series from Union Carbide) alcohols, sulfosuccinates (e.g. Aerosol® series from Cytec), organosilicones (e.g. Silwet® series from Witco) and fluoro surfactants (e.g. Zonyl® series from DuPont). Surfactants, if used, are typically in the amount of from about 0.01 to about 5% and preferably from about 0.2 to about 2%, based on the total weight of the ink.

Binders may be also used and can be soluble or dispersed polymer(s), added to the ink to improve the adhesion of a pigment. Examples of polymers that can be used include polyesters, polystyrene/acrylates, sulfonated polyesters, polyurethanes, polyimides and the like. When present, soluble polymer is advantageously used at levels of at least about 0.3%, and preferably at least about 0.6%, based on the total weight of the ink. Upper limits are dictated by ink viscosity or other physical limitations.

When the substrates used with the invention are porous, such as paper and textiles, binders can be added to reduce the penetration of the ink into the substrates. In other words with these additives, the ink will remain more on the surface of the porous substrate and the opacity hiding power and other printing parameters for the ink will be improved.

Ink Properties

Jet velocity, drop size and stability are greatly affected by the surface tension and the viscosity of the ink. Inkjet inks typically have a surface tension in the range of about 20 dyne/cm to about 60 dyne/cm at 25° C. Viscosity can be as high as 30 cps at 25° C. (30 cps or less), but is typically somewhat lower. The inks have physical properties compatible with a wide range of ejecting conditions, i.e., driving frequency of the piezo element, or ejection conditions for a thermal head, for either a drop-on-demand device or a continuous device, and the shape and size of the nozzle. The inks of this invention should have excellent storage stability for long periods so as not clog to a significant extent in an ink jet apparatus. Further, it should not alter the materials of construction of the ink jet printing device it comes in contact with, and be essentially odorless and non-toxic.

Although not restricted to any particular viscosity range or printhead, the inventive inks are suited to lower viscosity applications such as those required by higher resolution (higher dpi) printheads that jet small droplet volumes, e.g. less than about 20 pL. Thus the viscosity (at 25° C.) of the inventive inks can be less than about 7 cps, is preferably less than about 5 cps, and most advantageously is less than about 3.5 cps.

The inks of this invention are sufficiently stable to be effective inkjet inks. When tested by heating the inks for one week at 70° C., the physical parameters of particle size and viscosity should be in normal bounds. The inks should also be printable from the desired printing system for multiple days, without any observable decrease in performance.

Ink Sets

Ink sets contain the ink described above, and one or more other inks. The non-white inks of the ink set contain other colorants, and preferably other pigment colorants. By definition, pigments do not form (to a significant degree) a solution in the vehicle and must be dispersed. Other pigments for inkjet applications are generally well known. A representative selection of such pigments are found, for example, in U.S. Pat. Nos. 5,026,427, 5,086,698, 5,141,556, 5,169,436 and 6,160,370, the disclosures of which are incorporated by reference herein for all purposes as if fully set forth. The exact choice of pigment will depend upon color reproduction and print quality requirements of the application.

The levels of pigment employed in the other inks of the ink set are those levels that are typically needed to impart the desired OD to the printed image. Typically, such pigment levels are in the range of from about 0.01 to about 10% by weight, based on the total weight of the ink.

The other inks of the ink set can be aqueous or non-aqueous. The choice between the two systems is dictated by the requirements for matching the ink system to the printed substrate. For paper and textile substrates, aqueous systems are typically preferred. However, for plastic substrates non-aqueous vehicles may be preferred.

Other aqueous inks of the ink set may contain dyes, pigments or combinations thereof as the colorant. Such other aqueous inks are based on aqueous vehicles and other components and additives as described above or as otherwise are known to those of ordinary skill in the art and may, in a general sense, be considered known to those of ordinary skill in the art. Selection of other aqueous inks for the ink set can readily be made based upon the desired end use and compatibility with the inks of the present invention.

Non-aqueous inks generally comprise a colorant (preferably a pigment) in a "non-aqueous vehicle", which refers to a vehicle that is substantially comprised of a nonaqueous solvent or mixtures of such solvents, which solvents can be polar and/or nonpolar. Examples of polar solvents include alcohols, esters, ketones and ethers. Specific examples include mono- and di-alkyl ethers of glycols and polyglycols, such as monomethyl ethers of mono-, di- and tri-propylene glycols, and the mono-n-butyl ethers of ethylene, diethylene and triethylene glycols and glycerol and substituted glycerols. Examples of nonpolar solvents include aliphatic and aromatic hydrocarbons having at least six carton atoms, and mixtures thereof including refinery distillation products and by-products. The solvents may also be comprised in part, or entirely, or polymerizable solvents such as solvents which cure upon application of UV light (UV curable).

Glycol ethers include ethylene glycol monobutyl ether, diethylene glycol mono-n-propyl ether, ethylene glycol mono-iso-propyl ether, diethylene glycol mono-iso-propyl ether, ethylene glycol mono-n-butyl ether, ethylene glycol mono-n-butyl ether, diethylene glycol mono-n-butyl ether, triethylene glycol mono-n-butyl ether, diethylene glycol mono-t-butyl ether, 1-methyl-1-methoxybutanol, propylene glycol mono-t-butyl ether, propylene glycol mono-n-propyl ether, propylene glycol mono-iso-propyl ether, propylene glycol mono-n-butyl ether, dipropylene glycol mono-n-butyl ether, dipropylene glycol mono-n-propyl ether, and dipropylene glycol mono-isopropyl ether. Also useful are esters, especially acetate esters, of the preceding glycol ethers.

Even when no water is deliberately added to the non-aqueous vehicle, some adventitious water may be carried into the formulation, but generally this will be no more than about 2% to about 4% by weight, based on the total vehicle weight. By definition, the non-aqueous ink of this invention will have no more than about 10%, and preferably no more than about 5%, by weight of water based on the total weight of the non-aqueous vehicle.

Non-aqueous inks for inkjet applications also are in general well-known to those of ordinary skill in the art. Selection of non-aqueous inks for the ink set can readily be made based upon the desired end use and compatibility with the aqueous inks of the present invention.

Preferred non-aqueous inks for use in an ink set in combination with the ink of the present invention are disclosed in U.S. application Ser. No. 10/644,323 (filed Aug. 20, 2003), the disclosure of which is incorporated by reference herein for all purposes as if fully set forth.

The ink sets containing a white ink provide significant new breadth to printing capabilities. In one preferred embodiment, the ink set preferably comprises at least four differently colored inks—in addition to a white ink, the ink sets also contains a cyan, magenta and yellow ink. In addition to white and CMY, it may also be preferred that the ink sets further comprise a black ink.

In another preferred embodiment, the ink sets comprise a white ink and a black ink.

Methods of Printing

The inks and ink sets of the present invention can be utilized by printing with any inkjet printer.

The method of printing in accordance with the invention comprises the steps of:

(a) providing an ink jet printer that is responsive to digital data signals;
(b) loading the printer with a substrate to be printed;
(c) loading the printer with the above-mentioned inks and/or ink sets;
(d) printing onto the substrate using the inkjet ink set in response to the digital data signals.

When printing on a transparent substrate, like polyvinyl butyral, it is sometimes desirable for the image to only appear on one side or be visible from both sides. If the image is to be visible only on one side, the white ink could be printed first and printed in the shape of the image and with adjustable opaqueness such that the image would only appear from one side. The opaqueness can be adjusted by a variety of means including changing the titanium dioxide concentration in the ink, printing multiple times, etc.

If the image is to be seen from both sides then the white ink can be use to provide more flexibility to the image through the use of white. Its inclusion in parts of the image can improve the whiteness of image areas, and the clarity of the image. Nanograde titanium dioxide with its better transparency would be preferred in this application.

When printing on textiles, the white ink of this invention can provide other benefits. Often when textiles are printed the ink will feather into the textile giving an indistinct boundary. The white ink could be use to print a small, imperceptible boundary to a design and making it appear to have a distinct boundary.

The titanium dioxide white ink, since it is stable, can be added to another ink to provide a pigmented ink with both a pigment and a titanium dioxide pigment. While a white ink/pigmented ink would be lighter than the pigmented ink, it would retain the covering power and other beneficial properties of a combined ink because of the inclusion of the white ink.

Printed Substrates

The inks and ink sets can be used to print many substrates including paper, especially colored papers, packaging materials, textiles and polymer substrates. The instant invention is particularly advantageous for printing on polymeric (non-porous) substrates such as polyvinyl butyral interlayer (including 15 and 30 mil thickness); spun bonded polyolefin (e.g.Tyvek® and Tyvek® JetSmart, DuPont); polyvinyl chloride (e.g., Tedlar®, DuPont); polyethylene terephthalate polyester; polyvinyl fluoride polymer, acrylics (e.g., Surlyn®, DuPont) and the like.

A particularly preferred use for the ink sets of the present invention is the decorative printing of polyvinyl butyral interlayers used in safety or architectural glass applications, such as disclosed in commonly owned WO2004018197 entitled "Decorative Laminated Safety Glass", the disclosure of which is incorporated by reference herein for all purposes as if fully set forth.

EXAMPLES

Various abbreviations used in these Examples are listed below.

| | |
|---|---|
| DPM | dipropylene glycol methyl ether |
| DPMA | gipropylene glycol methyl ether acetate |
| TPnP | tripropylene glycol propyl ether |
| DPnP | dipropylene glycol propyl ether |
| TPM | tripropylene glycol methyl ether |
| DMEA | Dimethyl ethylamine |
| PNP | propylene glycol n-propyl ether |
| cps | centipoise |
| nBA | n-butyl acrylate |
| MA | methyl acrylate |
| AA | acrylic acid |
| MAA | methacrylic acid |
| MMA | methyl methacrylate |
| GMA | glycidyl methacrylate |

Methods

Titanium dioxide slurries were prepared from titanium dioxide pigments, dispersants, water and optional additives using a Dispermat® High Speed Disperser (HSD), available from VMA-Getzmann GMBH, to premix ingredients followed by media milling using an Eiger minimill, available from Eiger Machinery, Inc. Premixing of all slurry ingredients was performed using a Model AE5-CEX Dispermat operated typically at 2000 rpm with an attached 60 mm Cowels blade. Slurry premix was loaded into a 1-liter stainless steel vessel for media milling.

Slurry viscosity at a specific pigment loading was used to assess dispersant effectiveness. The most effective dispersant or combination of dispersants produced slurries with the lowest viscosity. Slurry viscosity was measured using a Brookfield viscometer and model RVTDV-II with measurements taken at 10 and 100 spindle rpm. Viscosity units are Centipoise (cps).

Titanium Dioxide Pigments

Commercially available titanium dioxide pigments were used. Two alumina-coated titanium dioxide pigments were used, R700 (available from E.I. DuPont de Nemours, Wilmington Del.) and RDI-S (available from Kemira Industrial Chemicals, Helsinki, Finland).

Ink Formulation and Evaluation

The inks were prepared by methods known to one skilled in the art, unless otherwise noted. Dispersions of the pigments (pigment slurries) were first prepared and, in a separate step, the ink components were combined and mixed together by ball milling, media milling, or other mixing means. In general 0.8 to 1.0 micron zirconia was used for the milling. After the ink was milled, it was filtered through a 1-micron filter paper to remove the media. If the ink did not filter well, it was not tested in a printer.

Printing Tests

Any printer can be used to test these white inks. Unless otherwise noted, the examples described below were done using an Epson 3000 ink jet printer and prints were made on various substrates. The white ink was used in place of the black ink and images were produced using PhotoShop Software.

Dispersant Preparation

In general, dispersants were prepared in a non-neutralized form and neutralization was done at the end of preparation, in a separate subsequent step, or after the mixture of dispersants was prepared. The dispersants were used as 25% to 50% by weight solution in common organic solvents. The amount of dispersant listed in the examples below was total weight of the added solution, not the active ingredients. Where ratios of dispersants to pigments are described, the ratio is given as active ingredients.

First Dispersant

The first dispersant, Dispersant 1, was a graft polymer with a comb-like structure, and its molecular configuration was:

nBA/MA/AA(45.5/45.5/9)//g-MMA/MAA(71.25/28.75)

The above representation illustrates the polymer backbone made up 69% of the polymer (nBA/MA/AA) wherein nBA is n-butyl acrylate, MA is methyl acrylate and AA is acrylic acid. The notation (45.5/45.5/9) indicates the relative percents of each monomer, that is, 45.5% n-butyl acrylate, 45.5% methyl acrylate, and 9% acrylic acid. The arms, which were the macromonomer, were 31% of the total polymer (g-MMA/MAA), wherein g-MMA is methyl methacrylate and MM is methacrylic acid, present in amounts of 71.25% and 28.75%, respectively. In this representation of the dispersants, a double slash indicates a separation between blocks, and a single slash indicates a random copolymer within a block.

The acid groups on the polymer were neutralized with dimethyl ethylamine (DMEA).

Second Dispersant

The second dispersant was one of three different block copolymers pre-pared using the GTP method disclosed in previously incorporated U.S. Pat. No. 4,656,226.

One of these dispersants, Dispersant 2A, had a molecular configuration of

BMA/MAA//MAA13/5//10 wherein BMA is butyl methacrylate and MM is methacrylic acid.

In this representation, which is different from the representation for the graft copolymer, the notation 13/5/10 indicates a block copolymer with the respective number of monomers. That is, one block is a random copolymer having 13 monomer units of BMA and 5 monomer units of MAA. The second block has 10 monomer units of MAA.

The second block copolymer dispersant, Dispersant 2B, had a molecular configuration of:

BMA//MAA13//10 wherein BMA and MAA are as defined above. The notation 13//10 indicates 13 monomer units of BMA and 10 monomer units of MAA in the block copolymer.

The third block copolymer dispersant, Dispersant 2C, had a molecular configuration of:

BMA//MMA/MAA10//5/10 wherein BMA, MMA and MAA are as defined above. The notation 10//5/10 indicates one block is a BMA polymer having 10 monomer units. The second block is a random copolymer having 5 monomer units of MMA and 10 monomer units of MAA.

Third Dispersant

The third dispersant was a phosphated acrylic comb copolymer containing phosphate functionality in the pigment adsorbing backbone segment and pre-pared using a standard free radical polymerization approach. The resulting phosphated copolymer had the following composition:

nBA/MA/GMA-Phosphated (45.5/45.5/9)//Bisomer 20W

The weight ratio of the phosphated portion to the Bisomer was 60:40.

The phosphate polymer was prepared using the macromonomer, Bisomer 20W, available from International Specialty Chemicals, as the stabilizing arms of the polymer. This material is a macromonomer of poly(ethylene glycol) monomethacrylate). It is nonionic with a molecular weight, Mw of 2000 and provides the water-soluble functionality to the polymer. The Bisomer 20W macromonomer, along with other ingredients, were reacted in a vessel to form the macro branched graft copolymer.

The polymer was formed by charging a reactor equipped with a stirrer, thermocouple, condenser and nitrogen blanket, and heating the contents to reflux. To the reactor, the backbone monomers of n-butyl acrylate (nBA), glycidyl methacrylate (GMA), methyl acrylate (MA) and the Bisomer 20W macromonomer were added with isopropanol as the solvent. The polymerization reaction was initiated by feeding the initiator 2,2'-azobis(2,4-dimethylvaleronitrile) (Vazo® 52 from DuPont Co.) which was dissolved in a solution of methyl ethyl ketone and isopropanol. The phosphating was accomplished by an esterification of the epoxy groups on glycidyl methacrylate with phosphoric acid, $H_3PO_4$.

The resulting phosphate acrylic graft copolymer reached 99% conversion. Its solids was 45% in a solution of water/isopropanol. The molecular weight of the polymer was obtained using GPC. The polymer was methylated prior to injection into the column. The GPC indicated a number average molecular weight of 4577 and a polydispersity of 2.64.

Pigment Slurry Examples (Slurry Ex) 1-4

Slurries based on dispersant blends were prepared using a Model AE5-CEX Dispersmat operated at 2000 rpm with an attached 60 mm Cowels blade. Dispersant 1 and Dispersant 2A were mixed together in either 75:25 or 50:50 blends (Dispersant 1:Dispersant 2A). Addition of the dispersant blend was slow and incremental to the titanium dioxide slurry. Composition information (in grams) and results are presented in Tables 1 and 2.

TABLE 1

Slurry Examples 1-4, Compositions

| Composition | Slurry Ex 1 Amount, g | Slurry Ex 2 Amount, g | Slurry Ex 3 Amount, g | Slurry Ex 4 Amount, g |
| --- | --- | --- | --- | --- |
| Deionized water | 188.45 | 188.45 | 188.45 | 188.45 |
| DMEA | 0.5 | 0.5 | 0.5 | 0.5 |
| Dispersant Blend 50:50 | 20 | 0 | 20 | 0 |
| Dispersant Blend 75:25 | 0 | 20 | 0 | 20 |
| Dehydran ® 1620 | 1 | 1 | 1 | 1 |
| R700 Pigment | 720 | 720 | 0 | 0 |
| RDIS Pigment | 0 | 0 | 720 | 720 |
| Let down deionized water | 70.05 | 70.05 | 70.05 | 70.05 |

TABLE 2

Slurry Examples 1-4, Viscosities

| Analysis | Slurry Ex 1 | Slurry Ex 2 | Slurry Ex 3 | Slurry Ex 4 |
|---|---|---|---|---|
| Solids, % | 72.43 | 72.1 | | |
| Brookfield Viscosity 20 rpm | 64 | 68 | 66 | 66 |
| Brookfield Viscosity 100 rpm | 91.6 | 95.2 | 100 | 101 |

As can be seen from Table 2, by blending two dispersants together, a desirable viscosity is achieved.

Stability testing was performed by exposing each slurry to 70° C. for one week. The slurries containing dispersant blends were generally stable and had less hard settling upon storage, but were susceptible to some chalking.

Slurry Ex 5

A titanium dioxide slurry with reduced chalking was prepared by mixing 138.45 g deionized water with 720 g of R700 $TiO_2$ pigment, 50 g of ethylene glycol as a humectant, 18.5 g of a 50:50 blend of Dispersant 1 and Dispersant 2B, 1 g DMEA and 2 g Dehydran® 1620. The slurry was let down with 70.05 g deionized water. Brookfield viscosity is shown in Table 3.

TABLE 3

Slurry Example 5, Properties

| Analysis | Before let down | After let down |
|---|---|---|
| Brookfield viscosity 20 rpm | 795 | 104 |
| Brookfield viscosity 100 rpm | 448 | 130 |
| Solids, % | 78.35 | 72.6 |

This sample showed improved stability and less chalking after heating at 70° C. for 1 week than did the slurries of Slurry Exs 1-4.

Slurry Ex 6

Titanium dioxide slurry premix was prepared by charging 138.45 g water, 1 g of 50% DMEA in water, 20 g of a 50:50 blend of Dispersant 1 and Dispersant 2B (37% solids), 50 g ethylene glycol, 2 g Dehydran® 1620 and 720 g of R700 pigment into a 1-liter stainless steel vessel, and processing for 10 minutes at 2000 rpm using a Dispermat High Speed Disperser configured with a 60 mm Cowels blade. The premix was let down with 68.55 g water, stirring at 250 rpm for 5 minutes.

The premix was then processed on an Eiger Mini Mill, model MK II M250 VSE EXP for 15 minutes at 3250 rpm disc speed with a 480 g media charge of 0.8-1.0 mm zirconia. Grinding was continued for 30 minutes with sampling at 10, 15, 20 and 30 minutes to determine particle size. The final product was about 72% solids. Results are provided in Table 4 before and after let down.

TABLE 4

Slurry Example 6 Particle Size vs. Milling Time

| c | Particle size, <204 nm | Median Particle Size 50% | 95% |
|---|---|---|---|
| 10 minutes | 30.82 | 240.2 | 395.9 |
| 15 minutes | 18.68 | 235.9 | 293.8 |
| 20 minutes | 26.42 | 246.7 | 380.9 |

This slurry product was stable over time and used in preparing white inks.

Ink Example (Ink Ex) 1, 2 and 3

The titanium dioxide slurry prepared in Slurry Ex 6 was used to prepare ink formulations in which the titanium dioxide solids loading was 5% (Ink Ex 1), 6% (Ink Ex 2) and 7% (Ink Ex 3). Slurry Ex 6 was first diluted with deionized water to obtain a slurry with a 15 wt % $TiO_2$ content (based on the total weight of the diluted slurry). An ink premix was prepared by adding together and mixing ink formulation ingredients listed below in Table 5. All of the ingredients were pre-mixed prior to addition of the 15 wt % titanium dioxide slurry. The 5% and 6% inks were prepared by the same process by simply adjusting the amount of diluted slurry added, to achieve the desired final concentration of titanium dioxide in the final ink.

TABLE 5

Ink Example 3, Compositions

| Added Ink Ingredient | Weight % in Ink |
|---|---|
| Titanium dioxide slurry | 47 |
| Ethylene Glycol | 13.5 |
| Glycerol | 13.5 |
| Proxel ® (biocide) | 0.16 |
| Deionized water | Balance |
| Silwet L-77 ® (surfactant) | 0.15 |
| Surfynol ® 104E (defoamer) | 0.15 |

Proxel® GXL is a biocide available from Avecia, Inc. Silwet L-77® is a surfactant available from GE Silicones. Surfynol® 104E is a defoamer available from Air Products.

Premix (ink without the titanium dioxide slurry) was mixed for 1 hour. With continuous mixing, the titanium dioxide slurry of Slurry Ex 6 was added to the premix by pumping the premix into the titanium dioxide slurry with recirculation through a feed tube. The ink was stirred for 4 hours.

Viscosity was measured, then the ink was filtered through a 1 micron filtration apparatus, removing large agglomerates, aggregates and particulates. Table 12 provides analysis of the inks. Particle size was measured using a Microtrac® Ultrafine Particle Analyzer (UPA) available from Leeds and Northrup.

TABLE 6

Ink Examples 1-3, Properties

| Ink Ex | $TiO_2$ loading, % | Brookfield Viscosity 30 rpm | 100 rpm | Particle size <204 nm | Microtrac 50%, nm | Particle Size 95%, nm |
|---|---|---|---|---|---|---|
| 1 | 5 | 2.44 | 2.47 | 1.07 | 258.5 | 308.0 |
| 2 | 6 | 2.46 | 2.47 | 0 | 295.0 | 345.9 |
| 3 | 7 | 2.46 | 2.44 | 0 | 385.4 | 547.1 |

The inks were tested for stability by placing the samples in an oven for 7 days at 70° C. Viscosity and particle size were compared before and after to assess stability of ink over time. Results are provided in Table 7.

TABLE 7

Ink Ex 1-3, Brookfield Viscosity and Properties after 7 days in the oven at 70° C.

| Ink Ex | Pigment Loading, % | Before 30 rpms | 60 rpms | After 30 rpms | 60 rpms |
|---|---|---|---|---|---|
| 1 | 5 | 1.42 | 1.20 | 1.30 | 1.30 |
| 2 | 6 | 1.22 | 1.21 | 1.20 | 1.17 |
| 3 | 7 | 1.80 | 1.93 | 1.82 | 1.86 |

| Ink Ex | Before <204 nm | 50% | 95% | After <204 nm | 50% | 95% |
|---|---|---|---|---|---|---|
| 1 | 19.37 | 290.0 | 498.4 | 0 | 261.8 | 301.2 |
| 2 | 0 | 306.2 | 378.4 | 0 | 308.5 | 360.9 |
| 3 | 7.33 | 266.2 | 362.1 | 1.32 | 251.9 | 296.1 |

Results for Ink Examples 1-3 listed in Table 7 show stability in the ink formulations, in that separation and particle settling were not observed.

Ink Ex 1, 2 and 3 were tested using a Piezo drop on demand (DOD) printhead consisting of 255 nozzles each with an average diameter of 50 microns. The volume of each droplet of ink was approximately 35 picoliters. The velocity through each nozzle was about 5 m/s. Ink was jetted out onto a clear overhead transparency film and black paper. The hiding power and opacity on the transparency film was judged as excellent and the adhesion to the transparency was also considered good. No nozzle outs resulted for Ink Ex 2 and 3. For Ink Ex 1 one nozzle out was observed.

Ink Example 4

Ink Example 4 was prepared by diluting Slurry Ex 6 with water to obtain a titanium dioxide slurry with 15% solids (79.2 grams of water added to 20.8 grams of Slurry Ex 6 to make a 6% solids ink). This diluted slurry was converted into an ink with the following formulation.

TABLE 8

Ink Example 4 Formulation

| Slurry 6 diluted to 15% solids | 40 |
|---|---|
| DPM | 36.92 |
| DPnP | 24.61 |
| PYK | 0.5 |
| pigment solids, (%) | 6.00 |
| Viscosity | 7.56 |
| Surface Tension | 26.37 |

Ink Ex 4 was printed onto a polyvinyl butyral interlayer. The interlayer was used to produce a decorative laminate as described in previously incorporated WO2004018197. The polyvinyl butyral interlayer was printed in a rectangle configuration in multiple passes to test for the % transmission, % haze and % clarity. Each pass was set for printing 100% coverage. After printing, the polyvinyl butyral interlayer was used to make a decorative laminate. A BKY Gardner Hazegard Plus Instrument was used to measure the % T, % H, and % C. Haze (wide angle scattering) is defined as the percentage of transmitted light that in passing through a sample deviates from the incident beam by more than 2.5°. Clarity (narrow angle scattering) is measured as scattering at less than 2.5°.

TABLE 9

Ink Ex 4, White Ink Printed Decorative Laminates

| Number of printing passes | Glass type | % Transmission | % Haze | % Clarity |
|---|---|---|---|---|
| 1 | Clear | 65.8 | 51.9 | 90.3 |
| 2 | Clear | 55.4 | 72.6 | 80.6 |
| 3 | Clear | 49.8 | 81.4 | 74.7 |
| 4 | Clear | 46.1 | 85.6 | 70.3 |
| 5 | Clear | 45.6 | 87.5 | 68.5 |
| 1 | Starphire | 66.2 | 49.3 | 90.7 |
| 2 | Starphire | 54.6 | 71.4 | 81.4 |
| 3 | Starphire | 48.5 | 80.3 | 75 |
| 4 | Starphire | 44.9 | 84.1 | 71 |
| 5 | Starphire | 42.1 | 86.7 | 69.4 |

The 'Clear' Glass is normal glass made by the float process, and it had a slightly green tint. The Starphire glass was the PPG "ultra-white" glass.

Test for Whiteness and Yellowness of White Ink Printed Substrates

The polyvinyl butyral decorative laminate used with Ink Ex 4 was tested for whiteness as measured by ASTM E 313, and yellowness as measured by ASTM D1925. The Whiteness Index was 45.12, and the Yellowness Index was—2.2.

The invention claimed is:

1. An aqueous inkjet ink comprising an aqueous vehicle having dispersed therein:
  (a) a titanium dioxide pigment;
  (b) a combination of dispersants comprising:
    (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
      (i) the polymeric backbone is hydrophobic in comparison to the macromonomer side chains and comprises one or more polymerized ethylenically unsaturated hydrophobic monomers and, optionally, up to about 20% by weight, based on the weight of the graft copolymer, of polymerized ethylenically unsaturated acid monomers; and
      (ii) each of the macromonomer side chains individually is a hydrophilic polymer containing acids groups attached to the polymeric backbone at a single terminal point, and
        (A) has a weight average molecular weight of from about 1000 to about 30000, and
        (B) comprises from about 2% to about 100% by weight, based on the weight of the macromonomer side chain, of a polymerized ethylenically unsaturated acid monomer, and
        (C) wherein the acid groups are at least partially neutralized, with an inorganic base and/or an amine;
    (2) a block copolymer of type AB, ABA or ABC wherein at least one of the blocks in the block copolymer is an adsorbing segment, and wherein at least one of the blocks in the block copolymer is a stabilizing segment.

2. The aqueous inkjet ink of claim 1, further comprising a phosphated acrylic copolymer, different from the graft copolymer (b)(1) or block copolymer (b)(2), comprising a hydrophilic stabilizing segment and a hydrophobic adsorbing segment.

3. The aqueous inkjet ink of claim 1, which is white.

4. An aqueous inkjet ink comprising a vehicle to which has been added an aqueous titanium dioxide slurry comprising:
   (a) a titanium dioxide pigment; and
   (b) a combination of dispersants comprising:
      (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
         (i) the polymeric backbone is hydrophobic in comparison to the macromonomer side chains and comprises polymerized ethylenically unsaturated hydrophobic monomers and, optionally, up to about 20% by weight, based on the weight of the graft copolymer, of polymerized ethylenically unsaturated acid monomers; and
         (ii) each of the macromonomer side chains individually is a hydrophilic polymer containing acids groups attached to the polymeric backbone at a single terminal point, and
            (A) has a weight average molecular weight of from about 1000 to about 30000, and
            (B) comprises from about 2% to about 100% by weight, based on the weight of the macromonomer side chain, of a polymerized ethylenically unsaturated acid monomer, and
            (C) wherein the acid groups are at least partially neutralized with an inorganic base or an amine;
      (2) a block copolymer of type AB, ABA or ABC wherein at least one of the blocks in the block copolymer is an adsorbing segment, and wherein at least one of the blocks in the block copolymer is a stabilizing segment; and
   (c) a liquid carrier.

5. The aqueous inkjet ink of claim 4, wherein the titanium dioxide slurry further comprises a phosphated acrylic copolymer, different from the graft copolymer (b)(1) or block copolymer (b)(2), comprising a hydrophilic stabilizing segment and a hydrophobic adsorbing segment.

6. The aqueous inkjet ink of claim 4, which is white.

7. The aqueous inkjet ink of claim 4, wherein the liquid carrier is an aqueous carrier.

8. An inkjet ink set comprising a plurality of colored, pigmented inks, at least one of which is a first aqueous inkjet ink comprising an aqueous vehicle having dispersed therein:
   (a) a titanium dioxide pigment;
   (b) a combination of dispersants comprising:
      (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
         (i) the polymeric backbone is hydrophobic in comparison to the macromonomer side chains and comprises one or more polymerized ethylenically unsaturated hydrophobic monomers and, optionally, up to about 20% by weight, based on the weight of the graft copolymer, of polymerized ethylenically unsaturated acid monomers; and
         (ii) each of the macromonomer side chains individually is a hydrophilic polymer containing acids groups attached to the polymeric backbone at a single terminal point, and
            (A) has a weight average molecular weight of from about 1000 to about 30000, and
            (B) comprises from about 2% to about 100% by weight, based on the weight of the macromonomer side chain, of a polymerized ethylenically unsaturated acid monomer, and
            (C) wherein the acid groups are at least partially neutralized, with an inorganic base and/or an amine;
      (2) a block copolymer of type AB, ABA or ABC wherein at least one of the blocks in the block copolymer is an adsorbing segment, and wherein at least one of the blocks in the block copolymer is a stabilizing segment.

9. The inkjet ink set of claim 8, further comprising a cyan ink, a magenta ink and a yellow ink.

10. The inkjet ink set of claim 8, further comprising a black ink.

11. An inkjet ink set comprising a plurality of colored, pigmented inks, at least one of which is a first aqueous inkjet ink comprising a vehicle to which has been added an aqueous titanium dioxide slurry comprising:
   (a) a titanium dioxide pigment; and
   (b) a combination of dispersants comprising:
      (1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
         (i) the polymeric backbone is hydrophobic in comparison to the macromonomer side chains and comprises polymerized ethylenically unsaturated hydrophobic monomers and, optionally, up to about 20% by weight, based on the weight of the graft copolymer, of polymerized ethylenically unsaturated acid monomers; and
         (ii) each of the macromonomer side chains individually is a hydrophilic polymer containing acids groups attached to the polymeric backbone at a single terminal point, and
            (A) has a weight average molecular weight of from about 1000 to about 30000, and
            (B) comprises from about 2% to about 100% by weight, based on the weight of the macromonomer side chain, of a polymerized ethylenically unsaturated acid monomer, and
            (C) wherein the acid groups are at least partially neutralized with an inorganic base or an amine;
      (2) a block copolymer of type AB, ABA or ABC wherein at least one of the blocks in the block copolymer is an adsorbing segment, and wherein at least one of the blocks in the block copolymer is a stabilizing segment; and
   (c) a liquid carrier.

12. The inkjet ink set of claim 11, further comprising a cyan ink, a magenta ink and a yellow ink.

13. The inkjet ink set of claim 11, further comprising a black ink.

14. A method for inkjet printing onto a substrate, comprising the steps of:
(1) providing an inkjet printer that is responsive to digital data signals;
(2) loading the printer with a substrate to be printed;
(3) loading the printer with an inkjet ink; and
(4) printing onto the substrate using the inkjet ink set in response to the digital data signals, wherein the inkjet ink is a first aqueous inkjet ink comprising an aqueous vehicle having dispersed therein:
(a) a titanium dioxide pigment;
(b) a combination of dispersants comprising:
(1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
(i) the polymeric backbone is hydrophobic in comparison to the macromonomer side chains and comprises one or more polymerized ethylenically unsaturated hydrophobic monomers and, optionally, up to about 20% by weight, based on the weight of the graft copolymer, of polymerized ethylenically unsaturated acid monomers; and
(ii) each of the macromonomer side chains individually is a hydrophilic polymer containing acids groups attached to the polymeric backbone at a single terminal point, and
(A) has a weight average molecular weight of from about 1000 to about 30000, and
(B) comprises from about 2% to about 100% by weight, based on the weight of the macromonomer side chain, of a polymerized ethylenically unsaturated acid monomer, and
(C) wherein the acid groups are at least partially neutralized, with an inorganic base and/or an amine;
(2) a block copolymer of type AB, ABA or ABC wherein at least one of the blocks in the block copolymer is an adsorbing segment, and wherein at least one of the blocks in the block copolymer is a stabilizing segment.

15. A method for inkjet printing onto a substrate, comprising the steps of:
(1) providing an inkjet printer that is responsive to digital data signals;
(2) loading the printer with a substrate to be printed;
(3) loading the printer with an inkjet ink; and
(4) printing onto the substrate using the inkjet ink set in response to the digital data signals, wherein the inkjet ink is a first aqueous inkjet ink comprising a vehicle to which has been added an aqueous titanium dioxide slurry comprising:
(a) a titanium dioxide pigment; and
(b) a combination of dispersants comprising:
(1) a graft copolymer having a weight average molecular weight of from about 4000 to about 100000, comprising from about 90% to about 50% by weight of a polymeric backbone, and from about 10% to about 50% by weight of macromonomer side chains attached to the backbone, the polymeric backbone and macromonomer side chains comprising 100 wt % of the graft copolymer, wherein:
(i) the polymeric backbone is hydrophobic in comparison to the macromonomer side chains and comprises polymerized ethylenically unsaturated hydrophobic monomers and, optionally, up to about 20% by weight, based on the weight of the graft copolymer, of polymerized ethylenically unsaturated acid monomers; and
(ii) each of the macromonomer side chains individually is a hydrophilic polymer containing acids groups attached to the polymeric backbone at a single terminal point, and
(A) has a weight average molecular weight of from about 1000 to about 30000, and
(B) comprises from about 2% to about 100% by weight, based on the weight of the macromonomer side chain, of a polymerized ethylenically unsaturated acid monomer, and
(C) wherein the acid groups are at least partially neutralized with an inorganic base or an amine;
(2) a block copolymer of type AB, ABA or ABC wherein at least one of the blocks in the block copolymer is an adsorbing segment, and wherein at least one of the blocks in the block copolymer is a stabilizing segment; and
(c) a liquid carrier.

* * * * *